(12) United States Patent
Jang (10) Patent No.: US 11,271,435 B2
(45) Date of Patent: Mar. 8, 2022

(54) WIRELESS POWER TRANSMISSION DEVICE FOR VEHICLE

(71) Applicant: AMOSENSE CO., LTD, Cheonan-si (KR)

(72) Inventor: Kil Jae Jang, Seongnam-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 168 days.

(21) Appl. No.: 16/619,725

(22) PCT Filed: Jun. 15, 2018

(86) PCT No.: PCT/KR2018/006760
§ 371 (c)(1),
(2) Date: Dec. 5, 2019

(87) PCT Pub. No.: WO2018/230991
PCT Pub. Date: Dec. 20, 2018

(65) Prior Publication Data
US 2020/0204004 A1 Jun. 25, 2020

(30) Foreign Application Priority Data

Jun. 16, 2017 (KR) .................. 10-2017-0076538
Jun. 14, 2018 (KR) .................. 10-2018-0067899

(51) Int. Cl.
*H02J 50/40* (2016.01)
*H02J 50/12* (2016.01)
(Continued)

(52) U.S. Cl.
CPC .............. *H02J 50/402* (2020.01); *B60L 1/00* (2013.01); *H02J 50/12* (2016.02); *H02J 50/70* (2016.02); *H02J 2310/48* (2020.01)

(58) Field of Classification Search
CPC .......... H02J 50/402; H02J 50/12; H02J 50/70; H02J 2310/48; H02J 50/005;
(Continued)

(56) References Cited

U.S. PATENT DOCUMENTS 9,397,505 B2 * 7/2016 Lee .................... H02J 50/80
9,935,481 B2 * 4/2018 Yamaguchi ............ H02J 50/40
(Continued)

FOREIGN PATENT DOCUMENTS

CN 105634148 A * 6/2016 ............... H01Q 7/00
CN 110419168 A * 11/2019 ............... H04B 5/00
(Continued)

OTHER PUBLICATIONS

International Search Report—PCT/KR2018/006760 dated Sep. 13, 2018.
(Continued)

*Primary Examiner* — Stacy Whitmore
(74) *Attorney, Agent, or Firm* — Cantor Colburn LLP (57) ABSTRACT

A wireless power transmission device for a vehicle is provided. A wireless power transmission device for a vehicle comprises: a magnetic field shielding sheet; at least one wireless power transmission antenna directly attached to one surface of the magnetic field shielding sheet; and at least one wireless communication antenna arranged at the same plane as the wireless power transmission antenna.

9 Claims, 8 Drawing Sheets

(51) Int. Cl.
*H02J 50/70* (2016.01)
*B60L 1/00* (2006.01)

(58) Field of Classification Search
CPC ......... H02J 7/00034; H02J 50/10; B60L 1/00; H01Q 7/06; H01Q 1/38; H01Q 1/3291; H04B 5/0037; H04B 1/036; H04B 5/0081; H04B 5/0031; H01F 27/366; H01F 27/2871; H01F 27/2876; H01F 27/22; H01F 27/025; H01F 2038/143; H01F 38/14; H01F 27/36; H01F 27/346; H01F 27/08; H01F 27/363
See application file for complete search history.

(56) References Cited

U.S. PATENT DOCUMENTS

| | | | | |
|---|---|---|---|---|
| 11,070,075 | B2* | 7/2021 | Yamaguchi | H01F 38/14 |
| 2012/0169443 | A1* | 7/2012 | Takiguchi | H01F 27/22 336/61 |
| 2013/0293027 | A1* | 11/2013 | Kim | H02J 7/025 307/104 |
| 2014/0284386 | A1* | 9/2014 | Finn | H01Q 7/06 235/488 |
| 2014/0300198 | A1* | 10/2014 | Wakabayashi | H01F 27/006 307/104 |
| 2014/0375262 | A1* | 12/2014 | Yamaguchi | H01Q 1/38 320/108 |
| 2018/0212475 | A1* | 7/2018 | Noh | H02J 50/005 |
| 2018/0219427 | A1* | 8/2018 | Baek | H05K 1/189 |
| 2019/0386515 | A1* | 12/2019 | Leem | H02J 50/12 |
| 2020/0235593 | A1* | 7/2020 | Jang | H02J 7/0044 |
| 2020/0328024 | A1* | 10/2020 | Kim | H01F 27/36 |
| 2020/0381178 | A1* | 12/2020 | Kweon | H01F 27/28 |

FOREIGN PATENT DOCUMENTS

| | | | | |
|---|---|---|---|---|
| EP | 2787595 | A2 * | 10/2014 | H01F 38/14 |
| JP | 2015521013 | | 7/2015 | |
| KR | 20150028397 | | 3/2015 | |
| KR | 20150051923 | | 5/2015 | |
| KR | 20170017416 | | 2/2017 | |
| KR | 20170048189 | | 5/2017 | |
| KR | 20170072712 | | 6/2017 | |
| WO | 2013180399 | | 12/2013 | |
| WO | WO-2014017351 | A1 * | 1/2014 | H01F 38/14 |
| WO | 2016114528 | | 7/2016 | |
| WO | 2016159551 | | 10/2016 | |
| WO | 2017014430 | | 1/2017 | |
| WO | 2017023080 | | 2/2017 | |
| WO | WO-2018230991 | A1 * | 12/2018 | H04B 1/036 |
| WO | WO-2019190091 | A1 * | 10/2019 | H02J 50/80 |

OTHER PUBLICATIONS

European Search Report—European Application No. 18818333.9 dated Jan. 29, 2021, citing WO 2017/023080 and WO 2016/159551.
Japanese Notice of Allowance—Japanese Application No. 2019-569482 dated Sep. 28, 2021, citing KR 10-2017-0017416, WO 2017/014430 and JP 2015-521013.
Korean Notice of Allowance—Korean Application No. 10-2018-0067899 dated Jun. 24, 2020, citing KR 10-2017-0017416, KR 10-2017-0048189, and KR 10-2017-0072712.

* cited by examiner

WIRELESS POWER TRANSMISSION DEVICE FOR VEHICLE

CROSS REFERENCE TO RELATED APPLICATION

This application is the national phase entry of International Application No. PCT/KR2018/006760, filed on Jun. 15, 2018, which is based upon and claims priority to Korean Patent Application 10-2017-0076538, filed on Jun. 16, 2017; and Korean Patent Application 10-2018-0067899, filed on Jun. 14, 2018. The entire contents of which are incorporated herein by reference.

TECHNICAL FIELD

The present invention relates to a wireless power transmission technology, and more specifically, to a wireless power transmission device for a vehicle that is capable of performing both of data communication and wireless charging.

BACKGROUND ART

Recently, the use of electronic devices configured to charge batteries using power supplied from the outside has been increasing. As an example, the electronic devices include mobile terminals such as mobile phones, smartphones, tablet personal computers (PCs), notebooks, digital broadcasting terminals, personal digital assistants (PDAs), portable media plays (PMPs), and navigation devices.

A user frequently charges a battery of an electronic device to continuously use the electronic device even in a case in which the user stays in a dynamic space such as in a vehicle. Accordingly, a charging system, which may charge a battery with power wirelessly transmitted through a non-contact method, is proposed to simply charge the battery of an electronic device in a vehicle.

Meanwhile, recent electronic devices may have various additional functions such as a wireless charging function and a data transmission function through near field communication (NFC). Accordingly, a user may receive various pieces of information of a vehicle through an electronic device using an NFC function and simply check the information of the vehicle through the electronic device.

Accordingly, a wireless power transmission device for a vehicle which is applied to a vehicle needs to transmit power to charge a battery of an electronic device and easily perform data communication for transmitting and receiving data.

That is, a wireless power transmission device for a vehicle applied to a vehicle needs a method capable of easily performing data communication without reducing charging efficiency.

DISCLOSURE

Technical Problem

The present invention is directed to providing a wireless power transmission device for a vehicle that is capable of preventing reduction of wireless charging efficiency even when both of a wireless communication antenna for data communication and a wireless power transmission antenna for wireless charging are provided.

Technical Solution

One aspect of the present invention provides a wireless power transmission device for a vehicle, including a magnetic field shielding sheet, at least one wireless power transmission antenna directly attached on one surface of the magnetic field shielding sheet, and at least one wireless communication antenna disposed to be coplanar with the wireless power transmission antenna.

The wireless power transmission antenna may include a first wireless power transmission antenna and a second wireless power transmission antenna which are formed as planar coils having hollow portion, and the first wireless power transmission antenna and the second wireless power transmission antenna may be disposed to be coplanar with each other.

The wireless communication antenna may be disposed inside the hollow portion of the wireless power transmission antenna or disposed to surround an outer side of the wireless power transmission antenna.

The wireless communication antenna may be a planar coil in which a conductive member is wound a plurality of times or an antenna pattern pattern-formed on one surface of a circuit board.

The magnetic field shielding sheet may include any one among an amorphous ribbon sheet, a ferrite sheet, and a polymer sheet. Preferably, the magnetic field shielding sheet may be a Ni—Zn ferrite sheet.

The wireless power transmission device for a vehicle may further include a heat radiation plate disposed one surface of the magnetic field shielding sheet and having a plate shape.

The heat radiation plate may be any one among a copper plate, an aluminum plate, and a graphite sheet having plate shapes.

The wireless power transmission device for a vehicle may further include at least one circuit board electrically connected to the wireless power transmission antenna and the wireless communication antenna, and a housing in which the circuit board is embedded and which has a heat radiation property to radiate heat generated by a heat source.

Advantageous Effects

According to the present invention, since a wireless communication antenna and a wireless power transmission antenna are disposed on the same surface of a shielding sheet, both data communication and wireless charging can be easily performed without reducing wireless charging efficiency.

MODES OF THE INVENTION

Hereinafter, embodiments that are easily performed by those skilled in the art will be described in detail with reference to the accompanying drawings. The embodiments of the present invention may be implemented in several different forms and are not limited to the embodiments described herein. Parts irrelevant to description are omitted in the drawings in order to clearly explain the embodiments of the present invention. Similar parts are denoted by similar reference numerals throughout this specification.

A wireless power transmission device 100 for a vehicle according to one embodiment of the present invention may be equipped or installed inside a vehicle. The wireless power transmission device 100 for a vehicle may transmit wireless power toward a wireless power receiving module embedded in an electronic device in a case in which the electronic device such as a smart phone approaches the wireless power transmission device 100 for a vehicle. Accordingly, a battery of the electronic device may be charged. Here, the electronic device may be a mobile electronic device such as a mobile phone, a personal digital assistant (PDA), a portable media play (PMP), a tablet, and a multimedia device.

To this end, the wireless power transmission device 100 for a vehicle according to one embodiment of the present invention includes an antenna unit and a magnetic field shielding sheet 120 as illustrated in FIGS. 1 to 8.

The antenna unit may perform various functions using a predetermined frequency band through a wireless method. To this end, the antenna unit may include a plurality of antennas, and the plurality of antennas may perform different functions. That is, the plurality of antennas may perform various functions such as a data communication function and a wireless power transmission function.

As an example, the antenna unit may include wireless power transmission antennas 111, 112, and 113 for transmitting wireless power toward a wireless power receiving module and a wireless communication antenna 114 or 214 for data communication.

In the present invention, the antenna may be a planar coil in which a conductive member is wound a plurality of times in a clockwise or counter-clockwise direction, and the planar coil may have any one shape among a circular shape, an oval shape, a quadrilateral shape, and a combined shape thereof.

In addition, the antenna may also be an antenna pattern in which a conductor such as a copper film is patterned in a loop shape on a circuit board or an antenna pattern in which a conductive ink is patterned in a predetermined loop shape on a circuit board. Here, the circuit board may be a flexible circuit board formed of a material such as polyimide (PI) and polyethylene terephthalate (PET) or may also be a rigid circuit board formed of a material such as flame retardant 4 (FR4).

Meanwhile, the wireless power transmission antennas 111, 112, and 113 may wirelessly transmit power through an inductive coupling method or a magnetic resonant coupling method based on an electromagnetic induction phenomenon. In addition, the wireless power transmission antennas 111, 112, and 113 may be antennas which operate according to a Qi standard or a physical medium attachment (PMA) standard in a frequency band ranging from 100 to 350 kHz through a self-induction method, may be antennas which operate according to an alliance for wireless power (A4WP) standard at a frequency of 6.78 MHz through a magnetic resonant coupling method or may also be antennas in which at least two among the Qi standard, the PMA standard, and the A4WP standard are combined.

In addition, the wireless communication antenna 114 may be a near field communication (NFC) antenna, and the NFC antenna may transmit or receive data using a frequency band of 13.56 MHz.

Here, the plurality of wireless power transmission antennas 111, 112, and 113 may be provided to be disposed to partially overlap each other. As an example, the wireless power transmission antennas may include a first wireless power transmission antenna 111, a second wireless power transmission antenna 112, and a third wireless power transmission antenna 113, and any one wireless power transmission antenna among the three wireless power transmission antennas may be disposed to partially overlap the remaining two wireless power transmission antennas.

Specifically, as an example, the first wireless power transmission antenna 111, the second wireless power transmission antenna 112, and the third wireless power transmission antenna 113 may be planar coils in which hollow portions are formed in central portions thereof, and the third wireless power transmission antenna 113 may be stacked to partially overlap the first wireless power transmission antenna 111 and the second wireless power transmission antenna 112.

That is, in the wireless power transmission device 100 for a vehicle according to one embodiment of the present invention, the wireless power transmission antennas may include at least two wireless power transmission antennas 111 and 112 which are disposed to be coplanar with each other. In addition, the wireless power transmission device 100 for a vehicle according to one embodiment of the present invention may include at least one wireless power transmission antenna 113 stacked on two wireless power transmission antennas 111 and 112 disposed to be coplanar with each other.

Hereinafter, for the sake of convenience in the description, two wireless power transmission antennas disposed to be coplanar with each other refer to the first wireless power transmission antenna 111 and the second wireless power transmission antenna 112, and the wireless power transmission antenna stacked on one surface of the first wireless power transmission antenna 111 and one surface of the second wireless power transmission antenna 112 refers to the third wireless power transmission antenna 113.

However, an arrangement relationship between the wireless power transmission antennas is not limited thereto, and a vertical arrangement relationship between the first wireless power transmission antenna 111, the second wireless power transmission antenna 112, and the third wireless power transmission antenna 113 forming a wireless power transmission antenna and the number of total use antennas may be suitably changed according to a design condition.

Meanwhile, the antenna unit may include the wireless communication antenna 114 or 214 for wirelessly transmitting data to the electronic device and receiving data therefrom.

In the present invention, the wireless communication antenna 114 or 214 may transmit various pieces of information of a vehicle toward the electronic device through wireless data communication and may transmit and receive control signals to control an operation of the vehicle.

Accordingly, the wireless power transmission device 100 for a vehicle according to one embodiment of the present invention may perform both of a wireless power transmission function using the wireless power transmission antennas 111, 112, and 113 and a data transmission and receiving function using the wireless communication antenna 114 or 214.

As an example, in the wireless power transmission device 100 for a vehicle according to one embodiment of the present invention, in a case in which the electronic device is disposed at a position corresponding to the wireless power transmission antennas 111, 112, and 113, the electronic device may simultaneously or individually perform battery charging using the wireless power transmission antennas 111, 112, and 113, and data communication using the wireless communication antenna 114 or 214.

Here, even when the wireless power transmission device 100 for a vehicle according to one embodiment of the present invention includes all of the wireless power transmission antennas and the wireless communication antenna, reduction of wireless charging efficiency can be prevented.

That is, since the wireless power transmission device 100 for a vehicle according to one embodiment of the present invention prevents increases in distances between the wireless power transmission antennas 111, 112, and 113 and a wireless power receiving antenna embedded in the electronic device, reduction of charging efficiency can be prevented.

To this end, in the wireless power transmission device 100 for a vehicle according to one embodiment of the present invention, the wireless communication antenna 114 or 214 may be disposed to be coplanar with the wireless power transmission antenna to prevent from being interfered with by the wireless power transmission antenna.

As an example, the wireless communication antenna 114 or 214 may be disposed to be coplanar with wireless power transmission antennas 111 and 112, which are directly attached to one surface of the magnetic field shielding sheet 120, among the plurality of wireless power transmission antennas 111, 112, and 113.

Figure 1:
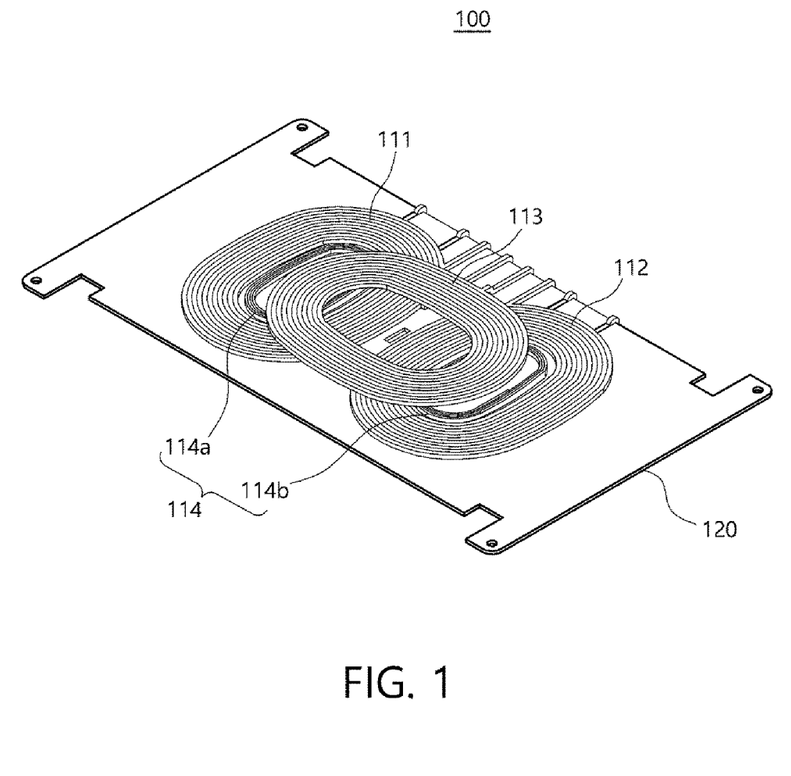
FIG. 1 is a view illustrating a wireless power transmission device for a vehicle according to one embodiment of the present invention.
Figure 2:
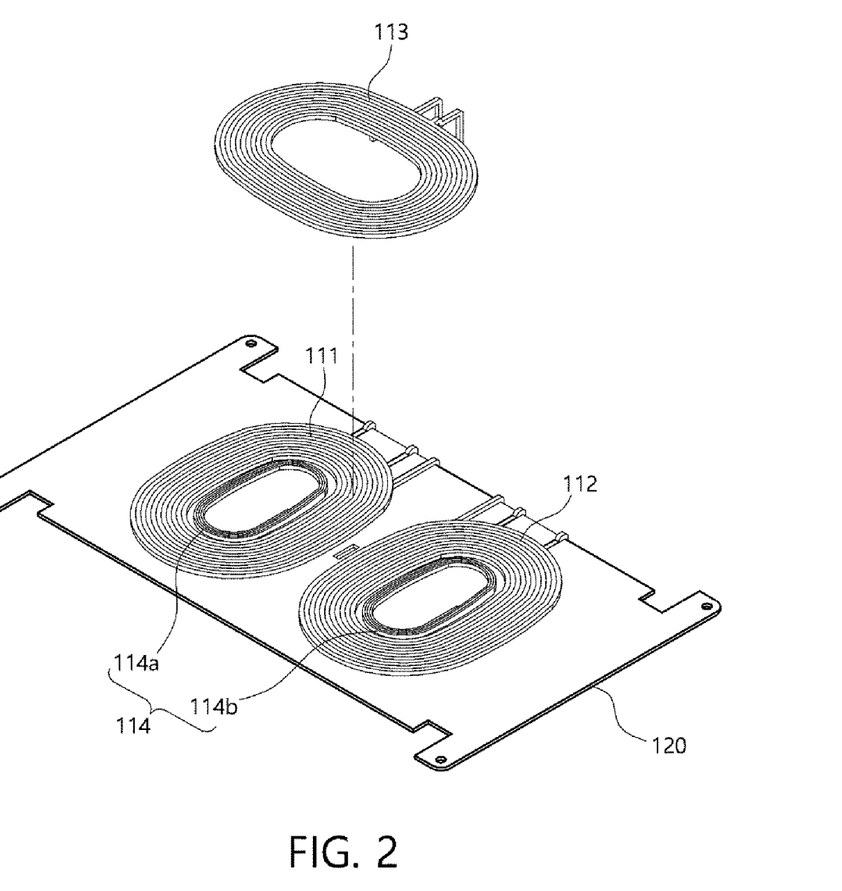
FIG. 2 is a view illustrating a state in which a third wireless power transmission antenna is separated from the wireless power transmission device for a vehicle shown in FIG. 1.

As a specific example, the wireless communication antenna 114 may be disposed inside hollow portions of the first wireless power transmission antenna 111 and the second wireless power transmission antenna 112 disposed on one surface of the magnetic field shielding sheet 120 as illustrated in FIGS. 1 and 2.

That is, the wireless communication antenna 114 may include a first communication antenna 114*a* and a second communication antenna 114*b*, and the first communication antenna 114*a* and the second communication antenna 114*b* may be disposed inside the hollow portions of the wireless power transmission antennas.

As a non-restrictive example, the first communication antenna 114*a* may be disposed inside the hollow portion of the first wireless power transmission antenna 111, and the second communication antenna 114*b* may be disposed inside the hollow portion of the second wireless power transmission antenna 112.

Here, the first communication antenna 114*a* and the second communication antenna 114*b* may be electrically connected in series.

In the present invention, when the first communication antenna 114*a* and the second communication antenna 114*b* are connected in series, end portions thereof may be physically directly connected, or the first communication antenna 114*a* and the second communication antenna 114*b* may be circuit-connected in series via a separate circuit.

Figure 3:
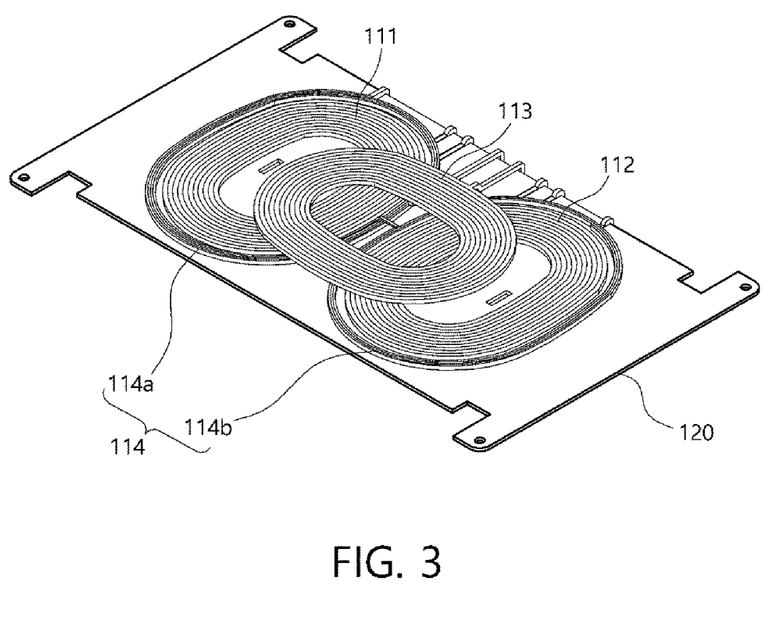
FIG. 3 is a view illustrating an arrangement relationship between a wireless communication antenna and a wireless power transmission antenna according to another embodiment which may be applied to FIG. 1.
Figure 4:
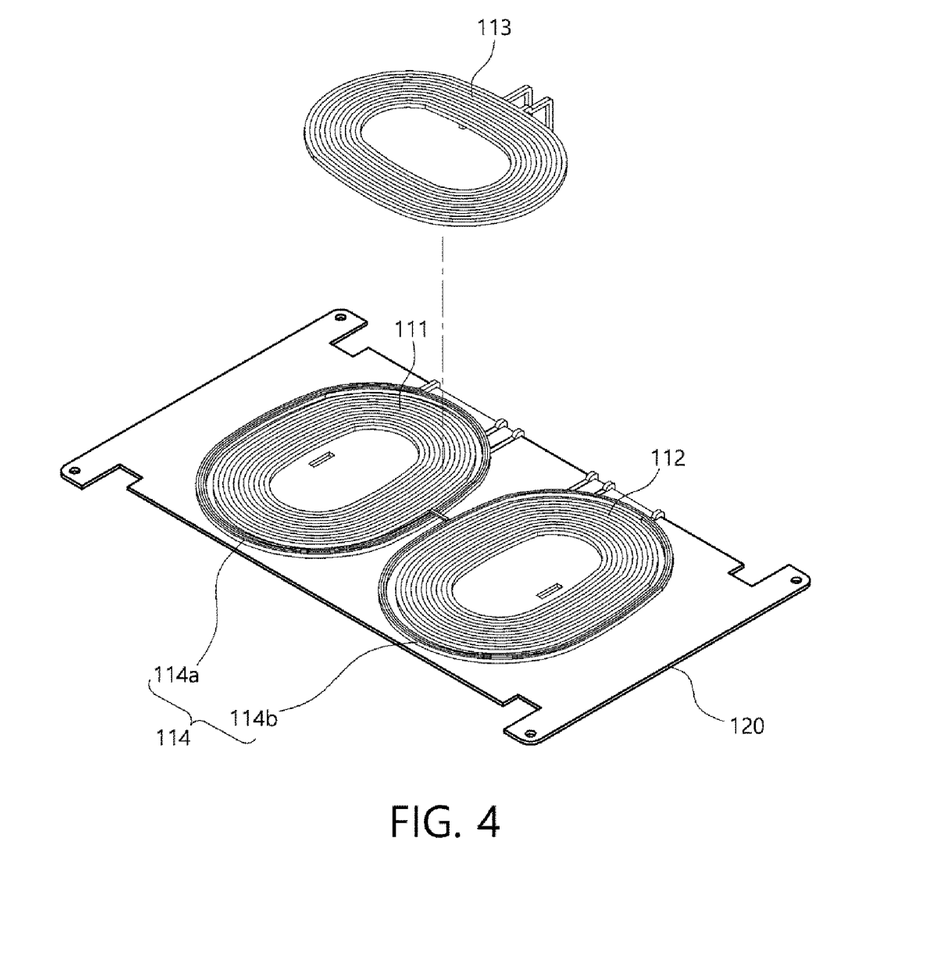
FIG. 4 is a view illustrating a state in which a third wireless power transmission antenna is separated from the wireless power transmission device for a vehicle shown in FIG. 3.

As another example, as illustrated in FIGS. 3 and 4, the wireless communication antenna 114 may be respectively disposed to surround outer sides of the first wireless power transmission antenna 111 and the second wireless power transmission antenna 112 which are disposed on the same surface of the magnetic field shielding sheet 120.

That is, the wireless communication antenna 114 may include the first communication antenna 114*a* and the second communication antenna 114*b*, and the first communication antenna 114*a* and the second communication antenna 114*b* may be disposed to surround the outer sides of the wireless power transmission antennas.

As a non-restrictive example, the first communication antenna 114*a* may be disposed to surround the outer side of the first wireless power transmission antenna 111, and the second communication antenna 114*b* may be disposed to surround the outer side of the second wireless power transmission antenna 112. In this case, the first communication antenna 114*a* and the second communication antenna 114*b* may be electrically connected in series like the above-described embodiment.

Figure 5:
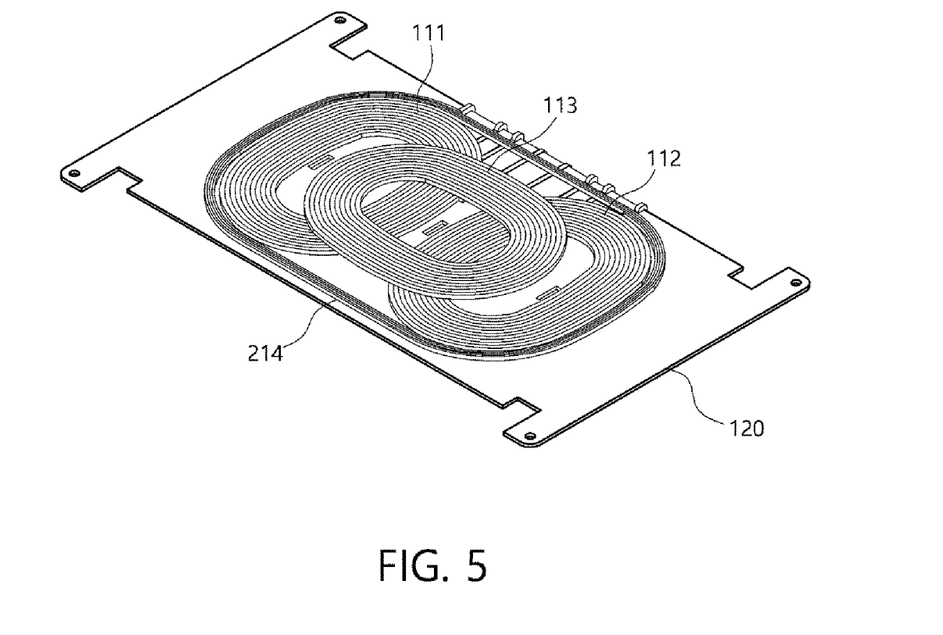
FIG. 5 is a view illustrating an arrangement relationship between a wireless communication antenna and a wireless power transmission antenna according to still another embodiment which may be applied to FIG. 1.

As still another example, as illustrated in FIG. 5, the wireless communication antenna 214 may be disposed to simultaneously surround outer sides of the first wireless power transmission antenna 111 and the second wireless power transmission antenna 112 disposed on the same surface of the magnetic field shielding sheet 120.

That is, the wireless communication antenna 214 may be formed as one member and disposed to simultaneously surround the outer sides of the first wireless power transmission antenna 111 and the second wireless power transmission antenna 112 which are disposed to be coplanar with each other.

Here, the wireless communication antenna 114 or 214 may be disposed to be spaced a gap from inner sides of the first wireless power transmission antenna 111 and the second wireless power transmission antenna 112 or from the outer sides thereof.

As an example, the wireless communication antenna 114 or 214 may be disposed to be spaced in a range of 1 to 2 mm from the inner sides of the first wireless power transmission antenna 111 and the second wireless power transmission antenna 112 or from the outer sides thereof.

Specifically, in a case in which the wireless communication antenna 114 is disposed in the hollow portions of the wireless power transmission antennas 111 and 112, the wireless communication antenna 114 may be disposed to be spaced gaps from edges which define the hollow portions.

In addition, in a case in which the wireless communication antenna 114 is disposed to surround the outer sides of the wireless power transmission antennas 111 and 112, the wireless communication antenna 114 may be disposed to be spaced gaps from edges of the wireless power transmission antennas 111 and 112.

Accordingly, in the wireless power transmission device 100 for a vehicle according to one embodiment of the present invention, even when the wireless power transmission antennas 111 and 112 and the wireless communication antenna 114 or 214 are disposed to be coplanar with each other, the wireless power transmission antennas 111 and 112 and the wireless communication antenna 114 or 214 may be disposed so as to not overlap each other.

Accordingly, in the wireless power transmission device 100 for a vehicle according to one embodiment of the present invention, when the electronic device is disposed close to a region corresponding to the wireless power transmission antennas 111, 112, and 113, the electronic device may simultaneously perform wireless charging using the wireless power transmission antennas 111, 112, and 113 and data communication using the wireless communication antenna 114 or 214 at one position even without changing a position thereof.

In addition, since the wireless power transmission antennas 111, 112, and 113 and the wireless communication antenna 114 or 214 do not overlap each other even when coplanar with each other, an increase in a total thickness of the antenna unit may be prevented. Accordingly, even when the wireless power transmission device 100 for a vehicle according to one embodiment of the present invention includes the wireless communication antenna 114 or 214 for data communication, since distances from the wireless power transmission antennas 111, 112, and 113 used for wireless charging to the wireless power receiving antenna of the electronic device are not changed, the wireless power transmission device 100 may maintain power transmission efficiency which is at the same level of a conventional wireless power transmission device.

This may be seen from Table 1 below.

In Table 1, a wireless power transmission antenna according to a conventional technology is a wireless power transmission device for a vehicle in which three planar coils are provided, any one planar coil (hereinafter, referred to as a 'third wireless power transmission antenna') and two planar coils (hereinafter, referred to as a 'first wireless power transmission antenna' and a 'second wireless power transmission antenna') which are coplanar with each other are disposed to partially overlap each other, and a wireless communication antenna is disposed above the third wireless power transmission antenna.

In Table 1 below, charging efficiency of each field is charging efficiency of each of the first wireless power transmission antenna, the second wireless power transmission antenna, and the third wireless power transmission antenna according to supplied power.

TABLE 1

| | Conventional Technology | | | Present Invention | | |
|---|---|---|---|---|---|---|
| Power | First Wireless Power Transmission Antenna | Second Wireless Power Transmission Antenna | Third Wireless Power Transmission Antenna | First Wireless Power Transmission Antenna | Second Wireless Power Transmission Antenna | Third Wireless Power Transmission Antenna |
| 5 W | 53.0% | 53.7% | 53.4% | 55.3% | 56.1% | 54.9% |
| 10 W | 63.9% | 63.8% | 63.1% | 65.5% | 66.4% | 65.9% |
| 15 W | 61.3% | 61.4% | 60.9% | 62.3% | 62.6% | 62.1% |

As seen from Table 1 above, charging efficiency of each of the wireless power transmission antennas of the wireless power transmission device 100 for a vehicle according to one embodiment of the present invention is increased regardless of a position thereof when compared to the conventional wireless power transmission device for a vehicle in which the wireless communication antenna is disposed above the third wireless power transmission antenna.

Meanwhile, in the present invention, the wireless communication antenna 114 or 214 may have a form in which a conductive member having a predetermined wire diameter is wound a plurality of times or may be an antenna pattern pattern-formed on one surface of a circuit board.

However, in a case in which the wireless communication antenna 114 or 214 is formed as the antenna pattern patterned on one surface of the circuit board, the circuit board may be suitably formed so as to not overlap a region corresponding to the first wireless power transmission antenna 111 and the second wireless power transmission antenna 112 which are disposed on the same surface each other. As an example, the circuit board may have a form in which a through hole is formed at a region corresponding to the first wireless power transmission antenna 111 and the second wireless power transmission antenna 112, or may be formed in a ring shape.

Accordingly, even when the wireless communication antenna 114 or 214 is formed to have the antenna pattern, a total thickness can be prevented from being increased by a thickness corresponding to the circuit board.

The magnetic field shielding sheet 120 may be formed of a plate member having a predetermined area. The wireless power transmission antennas 111, 112, and 113 may be disposed on one surface of the magnetic field shielding sheet 120.

Here, since the magnetic field shielding sheet 120 is formed of a magnetic material, the magnetic field shielding sheet 120 may shield a magnetic field generated by the antenna unit and improve convergence of the magnetic field in a required direction. Accordingly, performances of the antennas which operate in predetermined frequency bands may be improved.

As an example, an amorphous ribbon sheet, a ferrite sheet, a polymer sheet, or the like may be used as the magnetic field shielding sheet 120. Here, the amorphous ribbon sheet may be a ribbon sheet including at least one of amorphous alloys and nanocrystalline alloys, Fe or Co-based alloys may be used as the amorphous alloys, and a sintered ferrite sheet such as a Mn—Zn ferrite or Ni—Zn ferrite sheet may be used as the ferrite sheet.

In addition, the magnetic field shielding sheet 120 may be formed as a plurality of fine divided pieces so as to increase an overall resistance to suppress generation of an eddy current or so as to increase flexibility, and the plurality of fine pieces may be formed to be atypical.

In addition, the magnetic field shielding sheet 120 may be a multilayered sheet in which a plurality of magnetic sheets are stacked using adhesive layers. In this case, the plurality of magnetic sheets may be flaked into a plurality of fine divided pieces, and the fine pieces adjacent to each other may be partially or entirely insulated from each other.

In addition, the magnetic field shielding sheet 120 may be formed in a hybrid form including a first magnetic sheet and a second magnetic sheet having different characteristics. In this case, the first magnetic sheet may serve to improve performance of the wireless power transmission antenna, and the second magnetic sheet may serve to improve performance of the wireless communication antenna.

Alternatively, the magnetic field shielding sheet 120 may improve both performances of the wireless power transmission antenna and the wireless communication antenna using one magnetic sheet.

In this case, a Ni—Zn ferrite sheet may be used as the magnetic field shielding sheet 120 so as to maintain characteristics in which magnetic characteristics are not seriously degraded in a frequency band of 500 kHz or less and also of several MHz or more.

Accordingly, performance of the wireless power transmission antenna using a low frequency band of 500 kHz or less can be maintained, and degradation of performance of the wireless communication antenna using a high frequency band can also be prevented.

However, the magnetic field shielding sheet 120 is not limited thereto, and any known material used for a shielding sheet may be used therefor.

Figure 6:
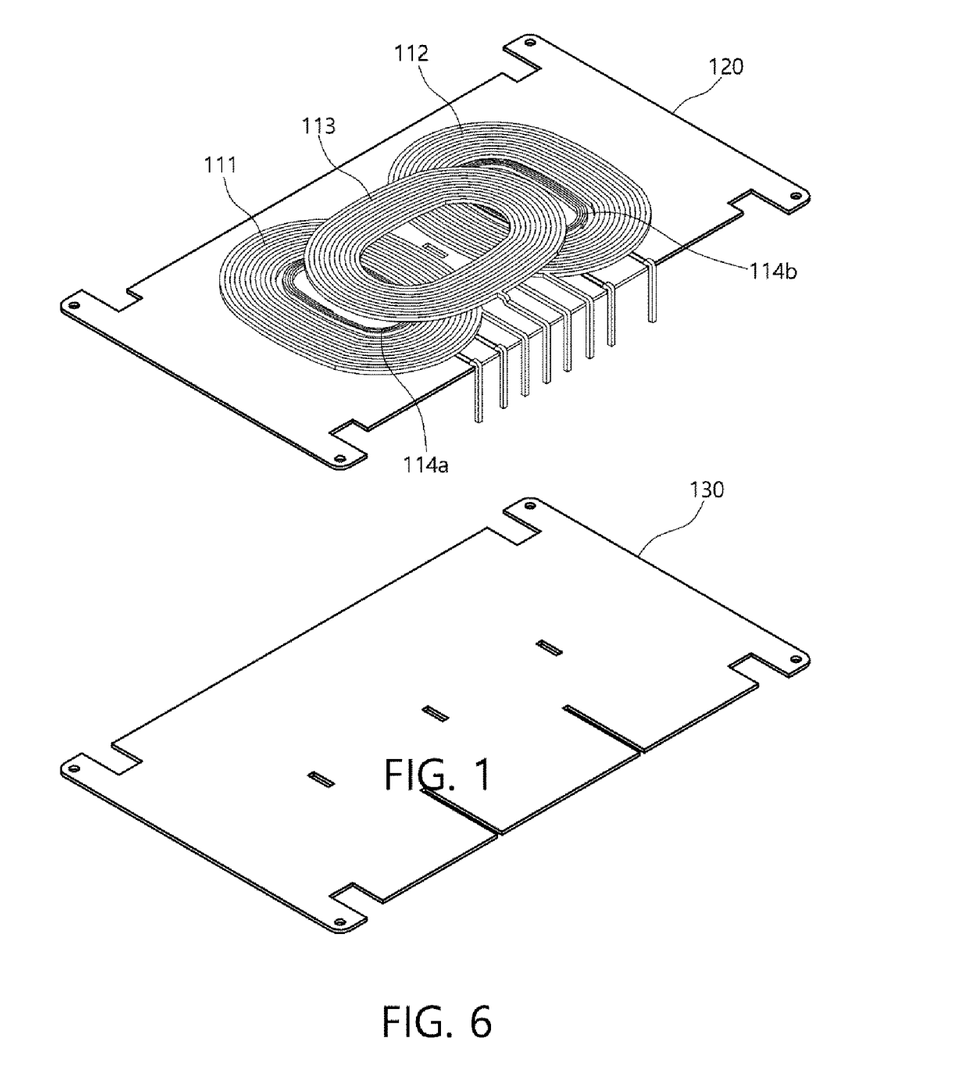
FIG. 6 is a view illustrating a case in which a heat radiation plate is applied to FIG. 1.
Figure 7:
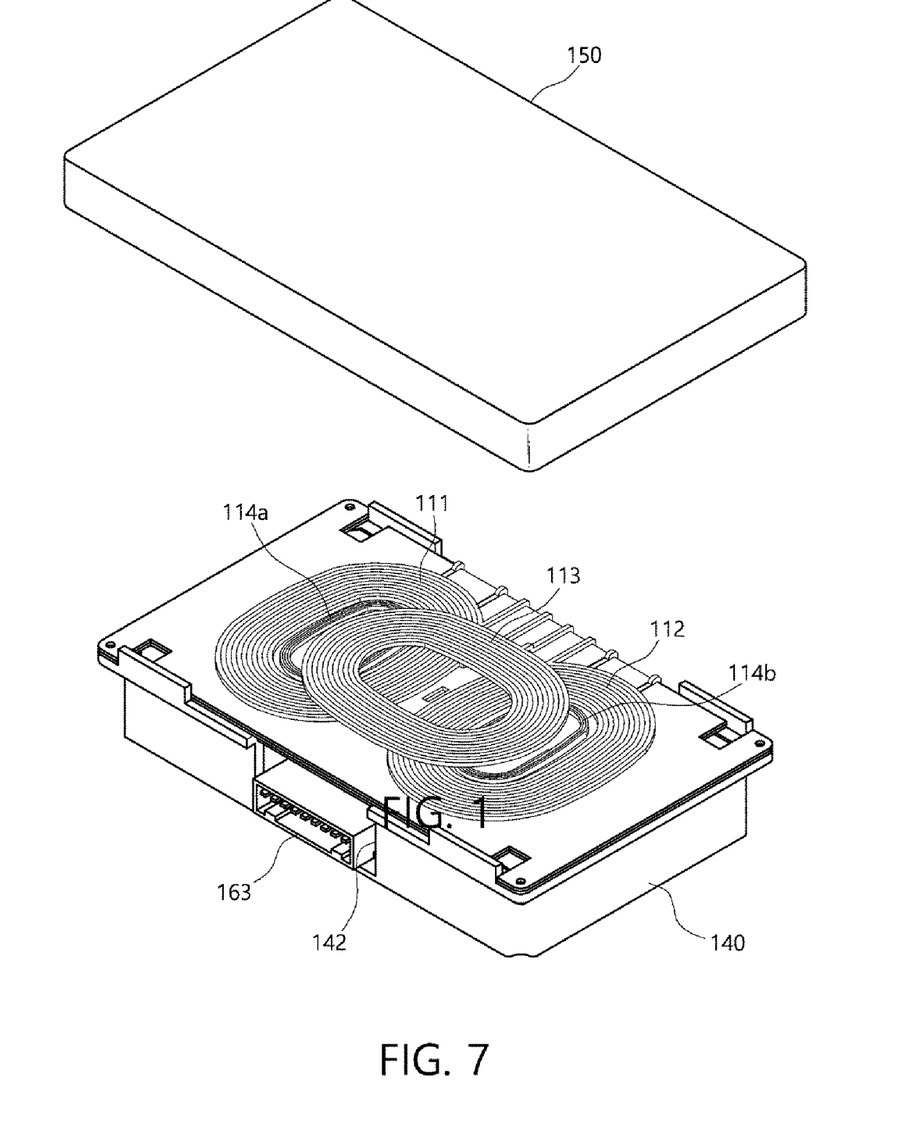
FIG. 7 is a view illustrating a case in which a heat radiation plate and a housing are applied to FIG. 1.
Figure 8:
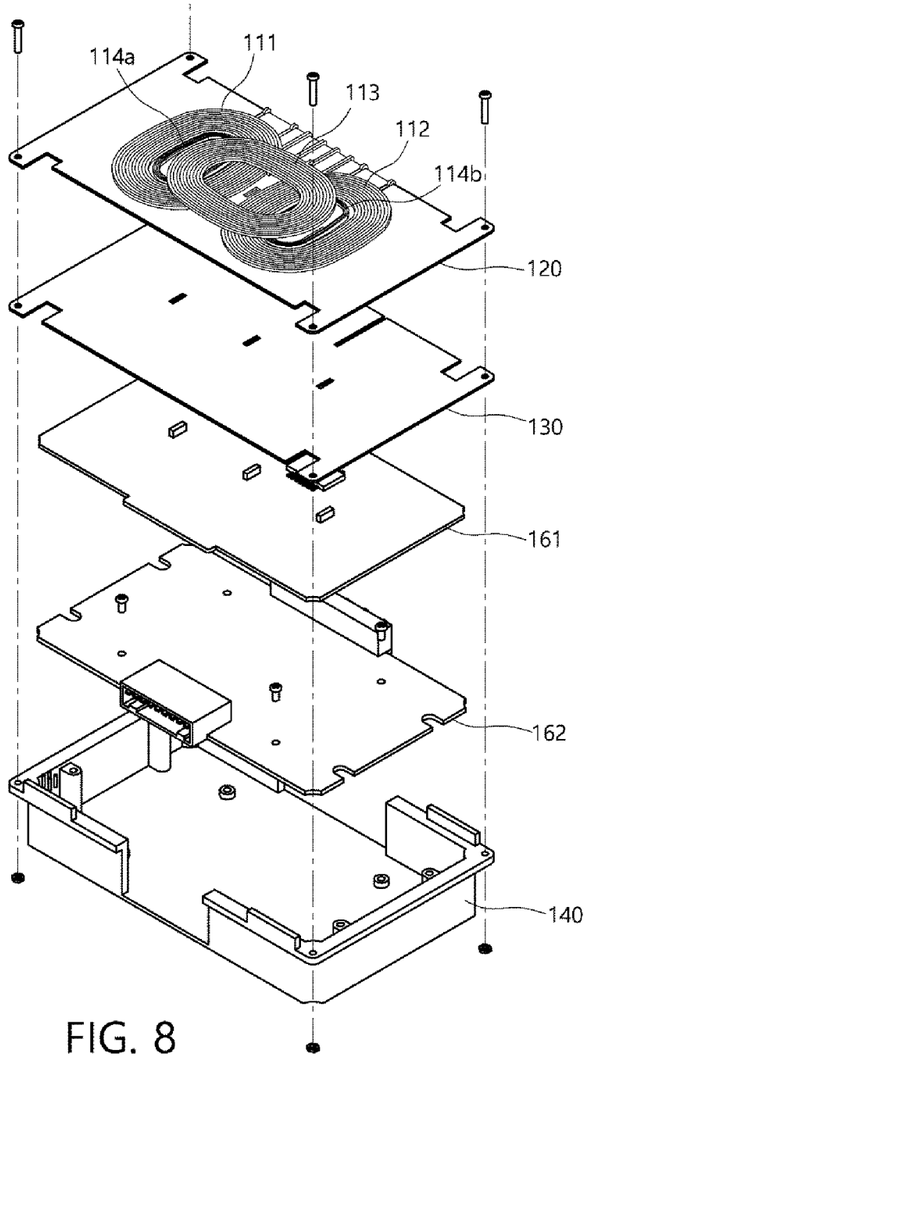
FIG. 8 is an exploded view of FIG. 7.

Meanwhile, the wireless power transmission device 100 for a vehicle according to one embodiment of the present invention may further include a heat radiation plate 130 having a predetermined area and a plate shape so as to improve a heat radiation performance as illustrated in FIGS. 6 to 8.

The heat radiation plate 130 may be disposed to be in contact with one surface of the magnetic field shielding sheet 120. Accordingly, the heat radiation plate 130 may distribute heat transmitted from a heat source or rapidly radiate the heat transmitted from the heat source to the outside.

To this end, the heat radiation plate 130 may be formed of a material having a high thermal conductivity. As an example, the heat radiation plate 130 may be formed of any one of copper, aluminum, and graphite, or may be formed of a combination of two or more thereof. In addition, the heat radiation plate 130 is not limited to the above-described one and may be formed of a material having a thermal conductivity of 200 W/m·K or more.

Here, the heat radiation plate 130 may be formed as a plate member having a predetermined area so as to increase a contact area with the heat source to rapidly distribute the heat generated by the heat source.

Preferably, the heat radiation plate 130 may be a metal plate having a plate shape so as to simultaneously serve a function of distributing or radiating the heat generated by the heat source such as the antenna unit and serve as a support which supports the magnetic field shielding sheet 120.

Accordingly, even when the magnetic field shielding sheet 120 is a sheet which has low strength or is flexible such as a ferrite sheet or polymer sheet, since the magnetic field shielding sheet 120 can be supported by the heat radiation plate 130 formed of a metal material having a predetermined strength, an assembling ability and a coupling ability thereof can be improved when the magnetic field shielding sheet 120 is assembled with another component such as a case or housing.

The heat radiation plate 130 may be attached to one surface of the magnetic field shielding sheet 120 using an adhesive layer (not shown).

Accordingly, since the heat generated by the antenna unit is distributed after being transmitted to the heat radiation plate 130 through the magnetic field shielding sheet 120, a temperature of air above the antenna unit may be decreased.

Although not illustrated in the drawings, the heat radiation plate 130 may be equally applied to the embodiments illustrated in FIGS. 3 to 5.

Meanwhile, the wireless power transmission device 100 for a vehicle according to the above-described embodiment may further include a housing 140 and a cover 150 detachable coupled to the housing 140 as illustrated in FIGS. 7 and 8. In this case, the wireless power transmission device for a vehicle may include the above-described heat radiation plate 130, and the wireless power transmission device for a vehicle may be installed to be flush inside the vehicle such that one surface of the cover 150 is exposed to the outside.

Specifically, the housing 140 may be formed to have a box form having an accommodation space in which an upper portion is open. In addition, at least one circuit board 161 or 162 electrically connected to the antenna unit and configured to control an overall operation of the wireless power transmission device 100 for a vehicle may be accommodated in the accommodation space.

Here, various circuit elements configured to control the overall operation of the wireless power transmission device for a vehicle may be mounted on the circuit board 161 or 162, and a driving chip configured to drive the antenna unit may be mounted thereon.

In addition, a plurality of the circuit components may be formed, or the circuit components may be integrally formed. In addition, at least any one of the circuit boards 161 and 162 may include a connector 163 for connection with an external power source, and the connector 163 may be exposed to the outside through an opening 142 formed at one side of the housing 140.

Although the housing 140 may be formed of a plastic material, the housing 140 may be formed of a material having a high thermal conductivity so as to radiate the heat generated by the heat source to the outside during the operation thereof. As an example, the housing 140 may be formed of a metal material such as copper or aluminum, or a heat-radiating plastic material.

While the specific embodiments of the present invention have been described, the scope of the present invention is not be limited to the suggested embodiments, and other embodiments may be easily suggested by those skilled in the art by adding, modifying, and deleting other components in the same scope of the present invention, and these may also be within the scope of the present invention.

The invention claimed is:

1. A wireless power transmission device for a vehicle, comprising:
   a magnetic field shielding sheet;
   a wireless power transmission antenna formed of a planar coil and directly attached on a surface of the magnetic field shielding sheet, wherein the wireless power transmission antenna includes: a first wireless power transmission antenna having a first hollow portion; and a second wireless power transmission antenna having a second hollow portion; and
   a wireless communication antenna disposed to be coplanar with the wireless power transmission antenna, wherein the wireless communication antenna includes: a first wireless communication antenna disposed inside the first hollow portion; and a second wireless communication antenna disposed inside the second hollow portion, and the first wireless communication antenna and the second wireless communication antenna is connected in series.

2. The wireless power transmission device of claim 1, wherein the wireless communication antenna is formed of a planar coil in which a conductive member is wound a plurality of times, or formed of an antenna pattern pattern-formed on a surface of a circuit board.

3. The wireless power transmission device of claim 1, wherein the magnetic field shielding sheet includes at least one among an amorphous ribbon sheet, a ferrite sheet, and a polymer sheet.

4. The wireless power transmission device of claim 1, wherein the magnetic field shielding sheet is a Ni—Zn ferrite sheet.

5. The wireless power transmission device of claim 1, further comprising a heat radiation plate disposed on a surface of the magnetic field shielding sheet.

6. The wireless power transmission device of claim 5, wherein the heat radiation plate is any one among a copper plate, an aluminum plate, and a graphite sheet.

7. The wireless power transmission device of claim 1, further comprising:
   at least one circuit board electrically connected to the wireless power transmission antenna and the wireless communication antenna; and
   a housing in which the circuit board is embedded and which has a heat source.

8. A wireless power transmission device for a vehicle, comprising:
   a magnetic field shielding sheet;
   a wireless power transmission antenna formed of a planar coil and directly attached on a surface of the magnetic field shielding sheet, wherein the wireless power transmission antenna includes: a first wireless power transmission antenna; and a second wireless power transmission antenna; and
   a wireless communication antenna disposed to be coplanar with the wireless power transmission antenna, wherein the wireless communication antenna includes: a first wireless communication antenna disposed to surround an outer side of the first wireless power transmission antenna; and a second wireless communication antenna disposed to surround an outer side of the second wireless power transmission antenna, and wherein the first wireless communication antenna and the second wireless communication antenna are connected in series.

9. A wireless power transmission device for a vehicle, comprising:
   a magnetic field shielding sheet;
   a wireless power transmission antenna formed of a planar coil and directly attached on a surface of the magnetic field shielding sheet, wherein the wireless power transmission antenna includes: a first wireless power transmission antenna; and a second wireless power transmission antenna; and
   a wireless communication antenna disposed to be coplanar with the wireless power transmission antenna, wherein the wireless communication antenna is disposed to surround an outer side of both the first wireless power transmission antenna and the second wireless power transmission antenna.

\* \* \* \* \*